(12) United States Patent
Manukyan et al.

(10) Patent No.: US 10,816,791 B1
(45) Date of Patent: *Oct. 27, 2020

(54) INSULATED NOTCH DESIGN FOR PIXELS IN AN ELECTROWETTING DEVICE

(71) Applicant: Amazon Technologies, Inc., Seattle, WA (US)

(72) Inventors: Gor Manukyan, Veldhoven (NL); Daniel Figura, Piestany (SK)

(73) Assignee: Amazon Technologies, Inc., Seattle, WA (US)

( * ) Notice: Subject to any disclaimer, the term of this patent is extended or adjusted under 35 U.S.C. 154(b) by 798 days.

This patent is subject to a terminal disclaimer.

(21) Appl. No.: 14/961,485

(22) Filed: Dec. 7, 2015

Related U.S. Application Data (63) Continuation of application No. 14/317,478, filed on Jun. 27, 2014, now Pat. No. 9,207,450.

(51) Int. Cl.
| | | |
|---|---|---|
| *G02B 26/00* | (2006.01) | |
| *G02B 1/04* | (2006.01) | |
| *G02B 1/06* | (2006.01) | |

(52) U.S. Cl.
CPC ............ *G02B 26/005* (2013.01); *G02B 1/04* (2013.01); *G02B 1/06* (2013.01)

(58) Field of Classification Search
CPC .... G02B 26/00; G02B 26/004; G02B 26/005; G02B 26/08; G02B 2207/115; G02B 26/007; G09G 3/28; G09G 3/34; G09G 3/3433; G09G 3/348; G09G 2300/0426; G09G 2300/0439; G09G 2300/08; G09G 2320/0252; G09G 2360/144; Y10T 29/49002; G02F 1/167

USPC ....... 359/290, 291, 295, 298, 228, 245, 253; 345/60, 64, 204, 212, 214

See application file for complete search history.

(56) References Cited

U.S. PATENT DOCUMENTS

| | | | |
|---|---|---|---|
| 7,746,540 B2 * | 6/2010 | Lo ..................... | G02B 26/005 359/245 |
| 7,791,815 B2 | 9/2010 | Weikart et al. | |
| 7,813,030 B2 * | 10/2010 | Lo ..................... | G02B 26/005 345/60 |
| 7,821,699 B1 * | 10/2010 | Lo ..................... | G02B 26/004 359/244 |

(Continued)

OTHER PUBLICATIONS

Dielectric constant for common material (Year: 2010).*

*Primary Examiner* — Bumsuk Won
*Assistant Examiner* — Ephrem Z Mebrahtu
(74) *Attorney, Agent, or Firm* — EIP US LLP (57) ABSTRACT

Subject matter disclosed herein relates to arrangements and techniques that provide for controlling motion of an electrowetting oil within an electrowetting display device. An electrowetting display device comprises a substrate, an electrode on the substrate, a dielectric layer on a first portion of the electrode. The electrode extends along the substrate one of either entirely from a first end of a pixel area to a second end of the pixel area, or from the first end of the pixel area to the second end of the pixel area such that a portion of the substrate is an electrode free portion to thereby define a notch. A first fluid is disposed on a hydrophobic layer and a second fluid is disposed on the first fluid, the second fluid being immiscible with the first fluid. A dielectric constant of the dielectric layer is greater than a dielectric constant of the first fluid.

18 Claims, 5 Drawing Sheets

(56) References Cited

U.S. PATENT DOCUMENTS

| | | | | |
|---|---|---|---|---|
| 8,059,328 B1* | 11/2011 | Kuo | ............... | G02B 26/005 |
| | | | | 359/290 |
| 8,520,286 B2 | 8/2013 | Clapp et al. | | |
| 8,675,273 B2 | 3/2014 | Yang et al. | | |
| 8,711,322 B2* | 4/2014 | Cheng | ............... | G02B 26/004 |
| | | | | 345/690 |
| 8,810,882 B2 | 8/2014 | Heikenfeld et al. | | |
| 8,970,965 B2 | 3/2015 | Tomotoshi et al. | | |
| 2009/0059348 A1* | 3/2009 | Niwano | ............... | G02B 26/004 |
| | | | | 359/296 |
| 2009/0169806 A1* | 7/2009 | Lo | ............... | G02B 26/005 |
| | | | | 428/119 |
| 2010/0108516 A1* | 5/2010 | Bartels | ............... | G02B 26/005 |
| | | | | 204/547 |
| 2010/0182290 A1* | 7/2010 | Matsuoka | ............... | G02F 1/167 |
| | | | | 345/205 |
| 2011/0286073 A1* | 11/2011 | Lo | ............... | G02B 26/005 |
| | | | | 359/290 |
| 2013/0050807 A1* | 2/2013 | Lee | ............... | G02B 26/005 |
| | | | | 359/316 |
| 2013/0250396 A1* | 9/2013 | Kim | ............... | G02B 26/005 |
| | | | | 359/290 |
| 2013/0301108 A1* | 11/2013 | Lim | ............... | G02B 26/005 |
| | | | | 359/290 |
| 2014/0016176 A1* | 1/2014 | Kodani | ............... | B01L 3/502707 |
| | | | | 359/290 |
| 2016/0201699 A1* | 7/2016 | Heikenfeld | ............... | B01L 3/502715 |
| | | | | 137/827 |

* cited by examiner

INSULATED NOTCH DESIGN FOR PIXELS IN AN ELECTROWETTING DEVICE

CROSS REFERENCE TO RELATED APPLICATIONS

This disclosure is a continuation of and claims priority to U.S. patent application Ser. No. 14/317,478, filed Jun. 27, 2014, now U.S. Pat. No. 9,207,450, issued Dec. 8, 2015, the entire contents of which are incorporated herein by reference.

BACKGROUND

Many portable electronic devices include displays for displaying various types of images. Examples of such displays include electrowetting displays (EWDs), liquid crystal displays (LCDs), electrophoretic displays (EPDs), light emitting diode displays (LED displays), etc. In EWD applications, a plurality of pixels (or sub-pixels) is defined between first and second substrates or support plates that are coupled together. The plurality of pixels is generally defined by pixel walls on the first substrate where each pixel includes electrowetting fluids. Each pixel is opened or closed based upon motion of the electrowetting fluids. With EWDs it is important to control the motion of the electrowetting fluids within the pixels in the same manner under all circumstances. Thus, it is important to have the pixels open and/or close in the same manner, i.e., to all open and/or close at the same or preferred opening point.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

DETAILED DESCRIPTION

The present disclosure provides arrangements and techniques that provide for controlling motion of an electrowetting oil within an electrowetting display device.

In general, image display apparatuses, such as, for example, various electronic devices, including, but not limited to, portable computing devices, tablet computers, laptop computers, notebook computers, mobile phones, personal digital assistants (PDAs), and portable media devices (e.g., e-book devices, DVD players, etc.), display images on a display. Examples of such displays include, but are not limited to, LCDs, EWDs and EPDs.

More particularly, a display device, such as an electrowetting display device, for example, can be a thin film transistor electrowetting display (TFT-EWD) that generally includes an array of transmissive, reflective and/or transflective pixels configured to be operated by an active matrix addressing scheme. For example, rows and columns of pixels are operated by controlling voltage levels on a plurality of source lines and gate lines. In this fashion, the display device can produce an image by selecting particular pixels to transmit, reflect or block light. Pixels are addressed (e.g., selected) via rows and columns of the source lines and gate lines that are connected to transistors (e.g., used as switches) included in each pixel. Transistors take up a relatively small fraction of the area of each pixel. For example, the transistor can be located underneath the reflector in reflective displays.

Electrically, the pixel is a small capacitor with a layer of insulating optical material (e.g., liquid crystal material or electrowetting material) sandwiched between two substrates, wherein each substrate generally includes a transparent conductive indium tin oxide (ITO) layer that each serves as an electrode. A one-way current-passing characteristic of the transistor of the pixel prevents charge that is being applied to the pixel from draining between refresh cycles of the display's image.

An electrowetting display employs an applied voltage to change the surface tension of a fluid in relation to a surface. For instance, by applying a voltage to a hydrophobic surface via a pixel electrode in conjunction with a common electrode, the wetting properties of the surface can be modified so that a fluid has a greater affinity for the surface. Hydrophobic generally refers to repelling water or polar fluids while hydrophilic generally refers to having an affinity for water or polar fluids. As one example of an electrowetting display, the modification of the surface energy by applying a voltage causes the electrolyte, considered to be the second fluid in an electrowetting fluid, in individual pixels of the display to adhere to the modified surface and thus, replace a colored oil layer, considered to be the first fluid in an electrowetting fluid, in individual pixels of the display. The electrowetting oil layer is generally made up of an oil that is electrically non-conductive and may for instance be an alkane like hexadecane or silicone oil. Thus, the electrowetting fluids in the individual pixels of the display responding to the change in surface tension act as an optical switch. When the voltage is absent, the colored electrowetting oil forms a continuous layer within a pixel, and the color may thus be visible to a user of the display. On the other hand, when the voltage is applied to the pixel, the colored electrowetting oil is displaced and the pixel becomes transparent. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video and/or static content. In addition, the low power consumption of electrowetting displays in general makes the technology suitable for displaying content on portable display devices that rely on battery power.

In accordance with the various embodiments, each pixel includes a dielectric layer. The dielectric layer generally has a high dielectric constant that is greater than the dielectric constant of the electrowetting oil on the hydrophobic layer. The dielectric layer may comprise an organic material or an inorganic material. The dielectric layer is located at a portion of the pixel that is not close to the thin film transistor. The dielectric layer is located over the pixel electrode and under the hydrophobic layer. A portion of the dielectric layer is under the pixel wall, or at least in contact with the pixel wall. The presence of the dielectric layer means that the thickness of electrowetting oil on the dielectric layer is less than the thickness of electrowetting oil on the hydrophobic layer. In accordance with various embodiments, the pixel electrode does not extend all the way to the pixel wall under the dielectric layer to define a notch, i.e. an electrode free area. Thus, the dielectric layer is located on a portion of the pixel electrode and is also located on the notch, i.e., the portion of the substrate where the pixel electrode does not extend all the way to the pixel wall. Another dielectric layer or layers (not illustrated) may be located on the notch under the dielectric layer. Such dielectric layer(s) may generally not have a high dielectric constant in comparison to the electrowetting oil. Thus, an "insulated notch" is defined by the notch in conjunction with the portion of the dielectric layer over the notch. The fringe electric field effect is greater due to the presence of the end of the pixel electrode in conjunction with the substrate. Due to the greater fringe electric field effect and the thinness of the electrowetting oil on the dielectric layer the pixel will tend to open at the dielectric layer more consistently and accurately. Accordingly, the pixels will all generally have a similar manner of movement of the electrowetting oil from the dielectric layer towards the opposite end of the pixel away from the notch, although the direction of movement of the electrowetting oil within some or all of the pixels may be designed to be different.

Figure 1A:
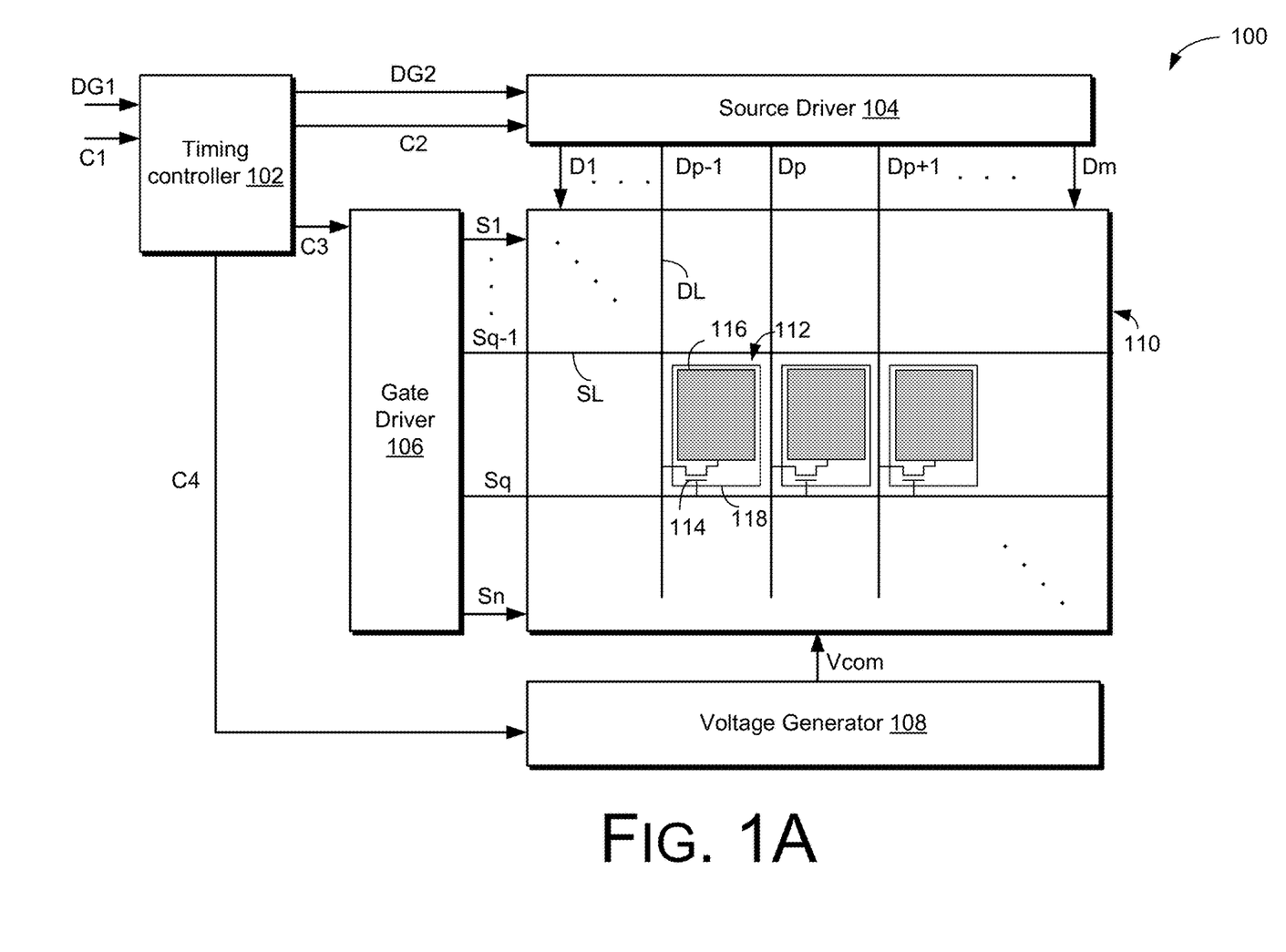
FIG. 1A is a schematic view of an example of an electrowetting display device, according to various embodiments.

Referring to FIG. 1A, an example of an electrowetting display device 100 is schematically illustrated that includes a timing controller 102, a source driver (data driver) 104, a gate driver (scan driver) 106, a voltage generator 108, and an electrowetting display panel 110. The electrowetting display panel 110 is driven by the timing controller 102, the source driver 104, the gate driver 106, and the voltage generator 108.

As an example of general operation of the electrowetting display device 100, responsive to a first data signal DG1 and a first control signal C1 from an external source, e.g., a graphic controller (not illustrated), the timing controller 102 applies a second data signal DG2 and a second control signal C2 to the source driver 104; a third control signal C3 to the gate driver 106; and a fourth control signal C4 to the voltage generator 108.

The source driver 104 converts the second data signal DG2 to voltages, i.e., data signals, and applies the data signals D1, . . . , Dp−1, Dp, Dp+1, . . . , Dm to the electrowetting display panel 110. The gate driver 106 sequentially applies scan signals S1, . . . , Sq−1, Sq, . . . , Sn to the electrowetting display panel 110 in response to the third control signal C3.

The voltage generator 108 applies a common voltage Vcom to the electrowetting display panel 110 in response to the fourth control signal C4. Although not illustrated in FIG. 1A, the voltage generator 108 generates various voltages required by the timing controller 102, the source driver 104, and the gate driver 106.

The electrowetting display panel 110 includes m data lines D, i.e., source lines, to transmit the data voltages and n gate lines S, i.e., scan lines, to transmit a gate-on signal.

Pixel areas 112 are positioned adjacent to crossing points of the data lines D and the gate lines S crossing the data lines D and thus are arranged in a grid of rows and columns. Each pixel area 112 includes a hydrophobic surface (not illustrated in FIG. 1A), and a thin film transistor 114 and a pixel electrode 116 under the hydrophobic surface. Each pixel area 112 may also include a storage capacitor (not illustrated) under the hydrophobic surface. A pixel wall 118 defines the pixel area 112. Pixel areas 112 can represent pixels within the electrowetting display device 100 or sub-pixels within the electrowetting display device 100, depending upon the application for the electrowetting display device 100.

Figure 1B:
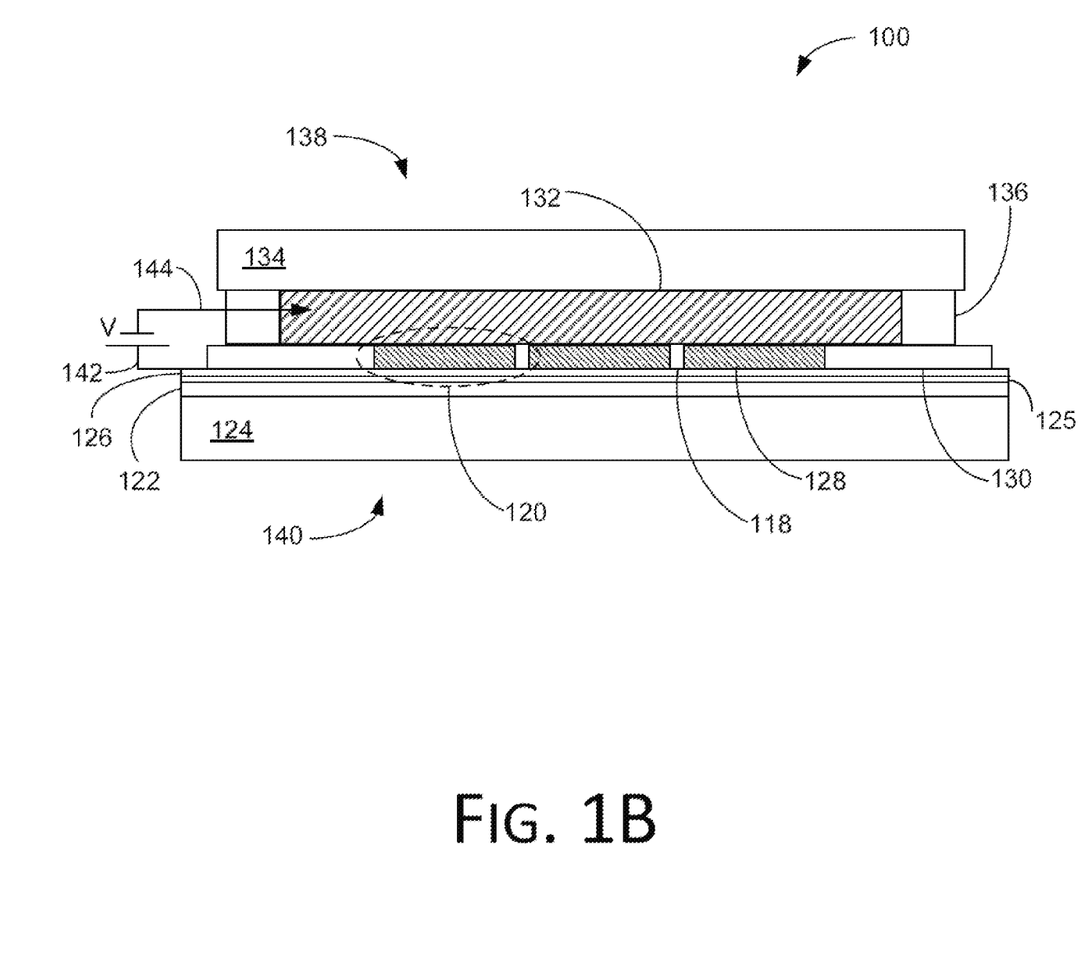
FIG. 1B is a cross-section of a portion of the electrowetting display device of FIG. 1A, according to some embodiments.

FIG. 1B is a cross-section of a portion of the electrowetting display device 100 illustrating several electrowetting elements 120 that generally correspond to pixel areas 112, according to some embodiments. An electrode layer 122 that includes the pixel electrodes 116 (not illustrated in FIG. 1B) is formed on a bottom substrate or support plate 124. The electrode layer 122 generally comprises indium tin oxide (ITO). In some implementations, a dielectric barrier layer 125 may at least partially separate the electrode layer 122 from a hydrophobic layer 126 also formed on the bottom substrate 124 over the electrode layer 122. In some implementations, the hydrophobic layer 126 can comprise a fluoropolymer, such as, for example, AF1600, produced by DuPont, based in Wilmington, Del. The pixel walls 118 form a patterned electrowetting element grid on the hydrophobic layer 126, as can be seen in FIG. 1A. The pixel walls 118 may comprise a photoresist material, such as, for example, epoxy-based negative photoresist SU-8. The patterned electrowetting element grid comprises rows and columns that form an electrowetting element array (e.g., electrowetting display panel 110) of field electrowetting elements and border electrowetting elements. For example, an electrowetting element can have a width and length in a range of about 50 to 500 microns. A first fluid 128, which can have a thickness in a range of about 1 to 10 microns, for example, overlies the hydrophobic layer 126. The first fluid 128 is generally an electrowetting oil and is partitioned by the pixel walls 118 of the patterned electrowetting element grid. An outer rim 130 can comprise the same material as the pixel walls 118. A second fluid 132, such as a fluid that includes an electrolyte, overlies the electrowetting oil 128 and the pixel walls 118 of the patterned electrowetting element grid.

The second fluid 132 is immiscible with the first fluid 128. Generally, immiscible refers to the inability of the second fluid 132 to mix or blend with the first fluid 128. The second fluid 132 generally includes an electrolyte and is electrically conductive or polar and thus, is generally an electroconductive or polar liquid. The second fluid 132 may be water or a salt solution such as a solution of potassium chloride in a mixture of water and ethyl alcohol, for example.

The second fluid 132 is preferably transparent, but may be colored, absorbing. The first fluid 128, generally referred to as electrowetting oil, is electrically non-conductive and may for instance be an alkane like hexadecane or (silicone) oil. The hydrophobic layer 126 is arranged on the bottom substrate 124 to create an electrowetting surface area. The hydrophobic character causes the first fluid 128 to adhere preferentially to the bottom substrate 124 since the first fluid 128 has a higher wettability with respect to the surface of the hydrophobic layer 126 than the second fluid 132. Wettability relates to the relative affinity of a fluid for the surface of a solid. Wettability increases with increasing affinity, and it can be measured by the contact angle formed between the fluid and the solid and measured internal to the fluid of interest. For example, such a contact angle can increase from relative non-wettability of more than 90° to complete wettability at 0°, in which case the fluid tends to form a film on the surface of the solid.

A top substrate or support plate 134 covers the second fluid 132 and an adhesive/sealing material 136 retains the second fluid 132 over the electrowetting element array. The adhesive/sealing material 136 generally comprises ultraviolet (UV) curable epoxy glue, although other types of adhesive/sealing material are acceptable. The bottom substrate 124 and the top substrate 134 may be separate parts of individual electrowetting elements or the bottom substrate 124 and the top substrate 134 may be shared by a plurality of electrowetting elements. The bottom substrate 124 and the top substrate 134 may be made of glass or polymer and may be rigid or flexible, for example.

A voltage V applied across the second fluid 132 and the dielectric barrier layer stack (e.g., the hydrophobic layer 126) of individual electrowetting elements can control transmittance or reflectance of the individual electrowetting elements.

The electrowetting display device 100 has a viewing side 138 on which an image for display formed by the electrowetting display device 100 can be viewed, and a rear side 140. The top substrate 134 faces viewing side 138 and the bottom substrate 124 faces the rear side 140. The top substrate 134 is coupled to the bottom substrate 124 with the adhesive/sealing material 136. In an alternative embodiment, the electrowetting display device 100 may be viewed from the rear side 140. The electrowetting display device 100 may be a reflective, transmissive or transreflective type. The electrowetting display device 100 may be a segmented display type in which the image is built up of segments. The segments can be switched simultaneously or separately. Each segment includes one electrowetting element 120 or a number of electrowetting elements 120 that may be neighboring or distant from one another. The electrowetting elements 120 included in one segment are switched simultaneously, for example. The electrowetting display device 100 may also be an active matrix driven display type or a passive matrix driven display, just to name a few examples.

The electrode layer 122 is separated from the first fluid 128 and the second fluid 132 by an insulator, which may be the hydrophobic layer 126. The electrode layer 122 (and thereby the pixel electrodes 116) is supplied with voltage signals V by a first signal line 142 as will be further described herein. A second signal line 144 is electrically connected to an electrode (not illustrated in FIG. 1B) that generally corresponds to the common electrode previously mentioned that is in contact with the conductive second fluid 132. Thus, this electrode may be common to more than one electrowetting element 120 since the electrowetting elements 120 are generally fluidly interconnected by and share the second fluid 132 uninterrupted by the pixel walls 118. However, even in an embodiment where the pixel walls 118 extend to the top substrate 134, the electrode may be common to more than one electrowetting element 120. In such an embodiment, the second fluid 132 might not be shared where the pixel walls 118 surround each pixel area 112 without openings in the pixel walls through which the second fluid 132 may flow. The electrowetting elements 120 are controlled by the voltage V applied between the first and second signal lines 142 and 144.

The first fluid 128 absorbs at least a part of the optical spectrum. The first fluid 128 may be transmissive for a part of the optical spectrum, forming a color filter. For this purpose, the first fluid 128 may be colored by addition of pigment particles or dye, for example. Alternatively, the first fluid 128 may be black (e.g., absorbing substantially all parts of the optical spectrum) or reflecting. The hydrophobic layer 126 may be transparent or reflective. A reflective layer may reflect the entire visible spectrum, making the layer appear white, or part of it, making it have a color.

When the voltage V applied between the signal lines 142 and 144 is set at a non-zero active signal level, the electrowetting element 120 will enter into an active state. Electrostatic forces will move the second fluid 132 toward the electrode layer 122, thereby repelling the first fluid 128 from the area of the hydrophobic layer 126 to the pixel walls 118 surrounding the area of the hydrophobic layer 126, to a droplet-like shape. This action uncovers the first fluid 128 from the surface of the hydrophobic layer 126 of the electrowetting element 120. When the voltage across the electrowetting element 120 is returned to an in-active signal level of zero volts or a value near to zero volts, the electrowetting element 120 will return to an inactive state, where the first fluid 128 flows back to cover the hydrophobic layer 126. In this way, the first fluid 128 forms an electrically controllable optical switch in each electrowetting element 120.

Generally, the thin film transistor 114 includes a gate electrode that is electrically connected to a corresponding scan line of the scan lines S, a source electrode that is electrically connected to a corresponding data line (e.g., first signal line 142 of FIG. 1B) of the data lines D, and a drain electrode that is electrically connected to the pixel electrode 116. Thus, the pixel areas 112 are operated, i.e. driving of the electrowetting display device 100, based upon the scan lines S and the data lines D of FIG. 1A.

Figure 2A:
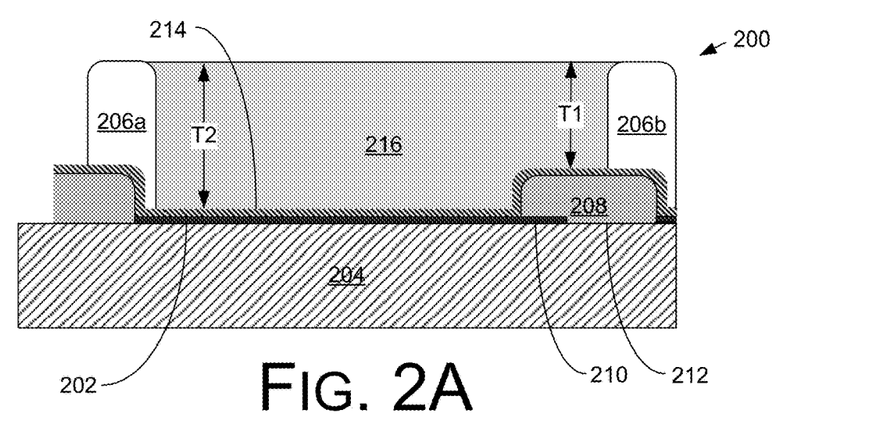
FIGS. 2A and 2B are simplified cross-sectional views of a portion of the electrowetting display device of FIGS. 1A and 1B including pixel walls.

FIG. 2A is a simplified cross-sectional view of a pixel area 200, which generally corresponds to a pixel area 112 of FIGS. 1A and 1B. An electrode layer 202 (which generally corresponds to the electrode layer 122 of FIG. 1B) is located on a substrate 204 (which generally corresponds to bottom substrate 124 of FIG. 1B). In accordance with various embodiments, the electrode layer 202 extends from one pixel wall 206a towards a second pixel wall 206b (which generally correspond to the pixel walls 118 of FIGS. 1A and 1B).

In accordance with various embodiments, the electrode layer 202 does not fully extend to the second pixel wall 206b. A dielectric layer 208 is provided at the end of the pixel area 200 that is adjacent to the second pixel wall 206b. As can be seen, the dielectric layer 208 is located directly on a portion 210 of the electrode layer 202 and is also located directly on a portion 212 of the substrate 204. However, in embodiments, there may be other layers on the substrate 204 between dielectric layer 208 and portion 212 of the substrate 204. The portion 212 generally defines a notch under the dielectric layer 208 from the end of the electrode layer 202 to the pixel walls 206b. A hydrophobic layer 214 (which generally corresponds to the hydrophobic layer 126 of FIG. 1B) is located on the electrode layer 202 and the dielectric layer 208. The pixel walls 206a, 206b are located on the hydrophobic layer 214. However, in embodiments, the hydrophobic layer 214 may not extend under the pixel walls 206a, 206b but rather may extend between the pixel walls 206a, 206b. The first pixel wall 206a is generally located adjacent to the thin film transistor 114 of FIG. 1A (not illustrated in FIG. 2A). Thus, the thin film transistor 114 is generally located away from dielectric layer 208. It does not necessarily need to be located adjacent to the first pixel wall 206a but rather generally away from the dielectric layer 208. An electrowetting oil 216 (generally corresponding to the first fluid 128 of FIG. 1B) is located on the hydrophobic layer 214. Thus, as can be seen in FIG. 2A, the presence of the dielectric layer 208 means that the thickness T1 of electrowetting oil 216 on the dielectric layer 208 is less than the thickness T2 of electrowetting oil 216 on the hydrophobic layer 214. In accordance with various embodiments, the dielectric layer 208 generally has a high dielectric constant that is greater than the dielectric constant of the electrowetting oil 216. For example, a dielectric constant of the dielectric layer 208 may be approximately 8 while the dielectric constant of the electrowetting oil 216 is approximately 2.5. This is only an example and is not meant to be limiting. As noted, the dielectric layer 208 has a dielectric constant that is greater than the dielectric constant of the electrowetting oil 216.

Figure 2B:
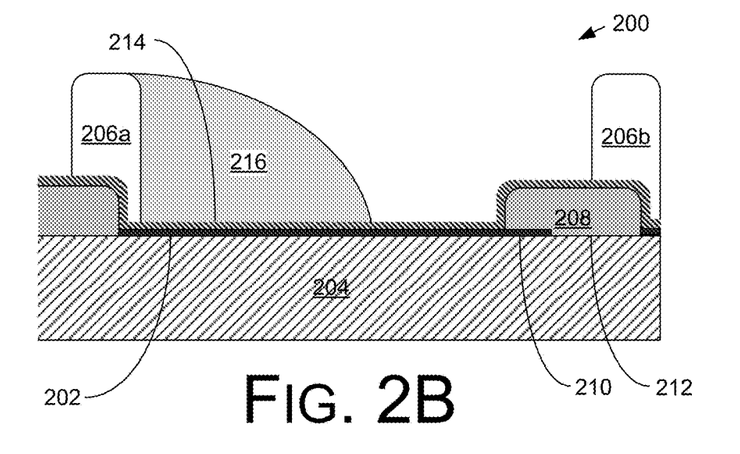

Referring to FIG. 2B, when voltage is applied to the pixel area 200 as previously described herein, the wetting properties of the surface of the hydrophobic layer 214 are modified so that the second fluid 132 (not illustrated in FIGS. 2A and 2B) has a greater affinity for the surface of the hydrophobic layer 214. Such modification causes the electrowetting oil 216 to "break" and move towards the pixel wall 206a at the opposite end of the pixel area 200 away from the dielectric layer 208. The second fluid 132 that includes the electrolyte becomes attracted to the hydrophobic layer 214 and generally displaces the electrowetting oil 216, as previously described. Thus, the pixel area 200 "opens" from the dielectric layer 208 towards the second pixel wall 206a.

Figure 2C:
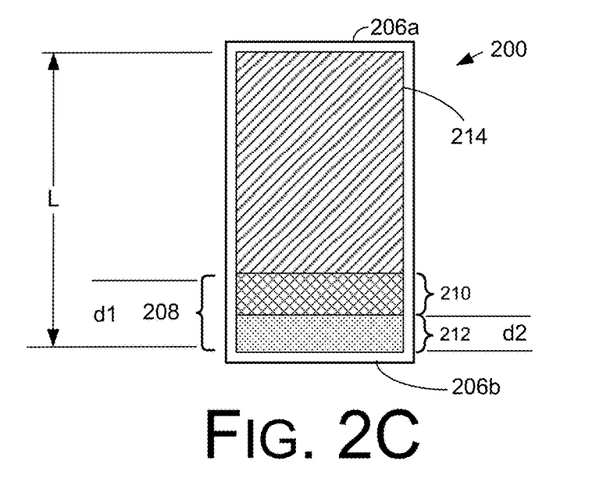
FIG. 2C is a simplified view of the layout of the portion of the electrowetting display device of FIGS. 2A and 2C.

FIG. 2C is a simplified view of the layout of the pixel area 200 illustrated in FIGS. 2A and 2B, without the electrowetting oil 216. As can be seen, the dielectric layer 208 extends across the width of the pixel area 200 adjacent to the pixel wall 206b and will generally extend continuously across adjacent pixel areas 200 (not illustrated), as will the hydrophobic layer 214. In accordance with the various embodiments the pixel area 200 has a substantially rectangular shape and can have a width and length in the range of about 50 to 500 micrometers. However, in other embodiments, the pixel area 200 may have a more square shape, a more triangular shape, a more circular shape, etc. depending on desired motion of the electrowetting oil 216. The dielectric layer 208 generally has a thickness in a range of approximately 0.5 to 1.5 micrometers and extends a distance d1 that is approximately twenty percent of the length L of the pixel area 200 from the second pixel wall 206b towards the first pixel wall 206a. Merely as an example, the dielectric layer 208 has a thickness of approximately 1 micrometer for a pixel wall 206b having a height of approximately 3 micrometers. In general, the thickness of the dielectric layer 208 is related to the difference between the dielectric constant of the dielectric layer 208 and the dielectric of the electrowetting oil 216. Generally, the greater the difference, then the thickness of the dielectric layer 208 may be smaller. The portion 212 of the substrate 204 generally extends from the second pixel wall 206b towards the first pixel wall 206a a distance d2 that is up to approximately fifteen percent of the length L of the pixel area 200. Thus, the electrode layer 202 extends from a first portion of the substrate 204 to a second portion of the substrate 204 such that the second portion of the substrate is an electrode free portion to thereby define a notch (etched away portion 212).

In order to create the pixel area 200 of FIGS. 2A-2C, the electrode layer 202, which generally consists of a substance or material such as indium tin oxide (ITO) is deposited on the substrate 204. If the portion 212 of the substrate 204 is desired, then the portion 212 is created by etching away a portion of the electrode layer 202. The dielectric layer 208 is then deposited over the end portion 210 of the electrode layer 202 and any etched-away portion 212 of the electrode layer 202 on the substrate 204. The hydrophobic layer 214 is then deposited on the electrode layer 202 and the dielectric layer 208. The pixel walls 206 are deposited on the hydrophobic layer 214. The electrowetting oil 216 can then be deposited on the hydrophobic layer 214. Alternatively, the pixel walls 206 can be deposited before the hydrophobic layer 214 and dielectric layer 208 are deposited. In such an embodiment, the pixel walls 206 will be in contact with the hydrophobic layer 214 and the dielectric layer 208 as opposed to on the hydrophobic layer 214 and the dielectric layer 208. A top substrate (not illustrated in FIGS. 2A-2C), is then placed over the substrate 204 by, for example, a roll coupling method or an air film coupling method. Generally, the second fluid 132 (not illustrated in FIGS. 2A-2C) is provided and filled between the substrates at approximately the same time that the top substrate is coupled to the substrate 204. The two substrates can be fixed by using a heat or UV curable adhesive.

Thus, any etched-away portion 212 of the electrode layer 202 on the substrate 204 provides an "insulated notch" that is defined by the dielectric layer 208 and the etched-away portion 212, i.e. the dielectric layer 208 insulates the portion 212. The location of the end of the electrode layer 202 at the etched away portion 212 on the substrate 204 results in the electric field at that end of the electrode layer 202 being stronger due to the fringe field effect. As is known, with the fringe field effect, if one has two parallel plates forming a capacitor, the electric field does not end abruptly at the edge of the plates. There is some field outside the plates that curves from one plate to the other plate. Thus, there is more electric field present because of the fringe fields. Additionally, due to the higher dielectric constant of the dielectric layer 208 in comparison to the electrowetting oil 216, the voltage drop within the pixel area 200 is greater over the dielectric layer 208. Generally, the voltage drop realized over the dielectric layer 208 is inversely proportional to the dielectric constant of the dielectric layer 208. In response to voltage applied to the pixel area 200, the greater fringe electric field effect and the voltage drop at the thin layer of the electrowetting oil 216 on the dielectric layer 208 causes the electrowetting oil 216 to break away from the dielectric layer 208 to thereby open the pixel area 200. Thus, in accordance with various embodiments, the pixel area 200 generally opens more consistently and accurately. Accordingly, the pixel areas 200 will all generally act in a similar manner as far as movement of the electrowetting oil 216 from the dielectric layer 208 towards the pixel wall 206a.

Figure 3:
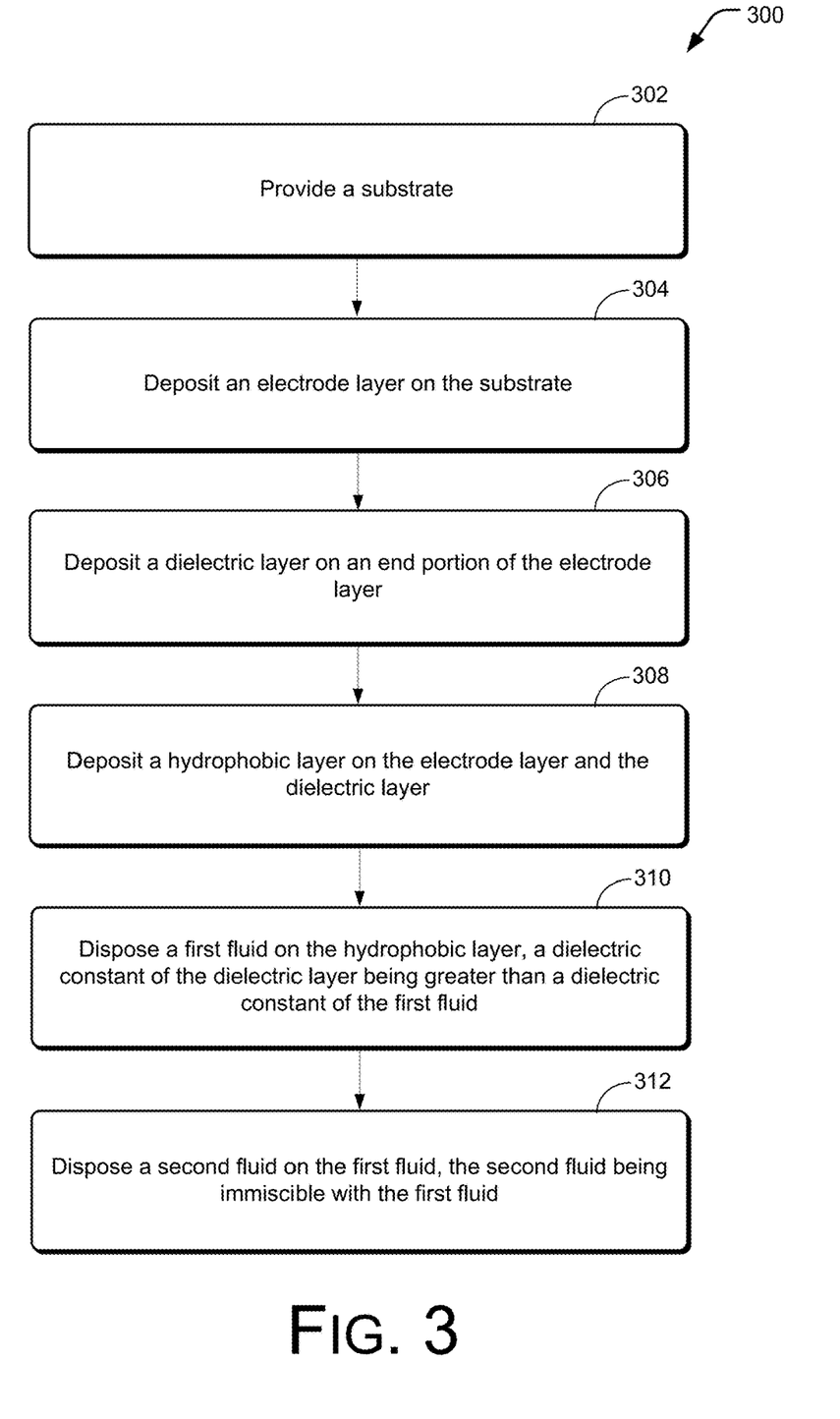
FIG. 3 is a flowchart illustrating an example of a process of making an electrowetting display device.

FIG. 3 is a flowchart illustrating a process 300 of an example of making an electrowetting display device, for example an electrowetting display device as described in FIGS. 1A, 1B, 2A, 2B and 2C. At 302, a substrate is provided. At 304, an electrode layer is deposited on the substrate. At 306, a dielectric layer is deposited on an end portion of the electrode layer. At 308, a hydrophobic layer is deposited on the electrode layer and the dielectric layer. At 310, a first fluid is disposed on the hydrophobic layer, a dielectric constant of the dielectric layer being greater than a dielectric constant of the first fluid. At 312, a second fluid is disposed on the first fluid, the second fluid being immiscible with the first fluid.

Figure 4:
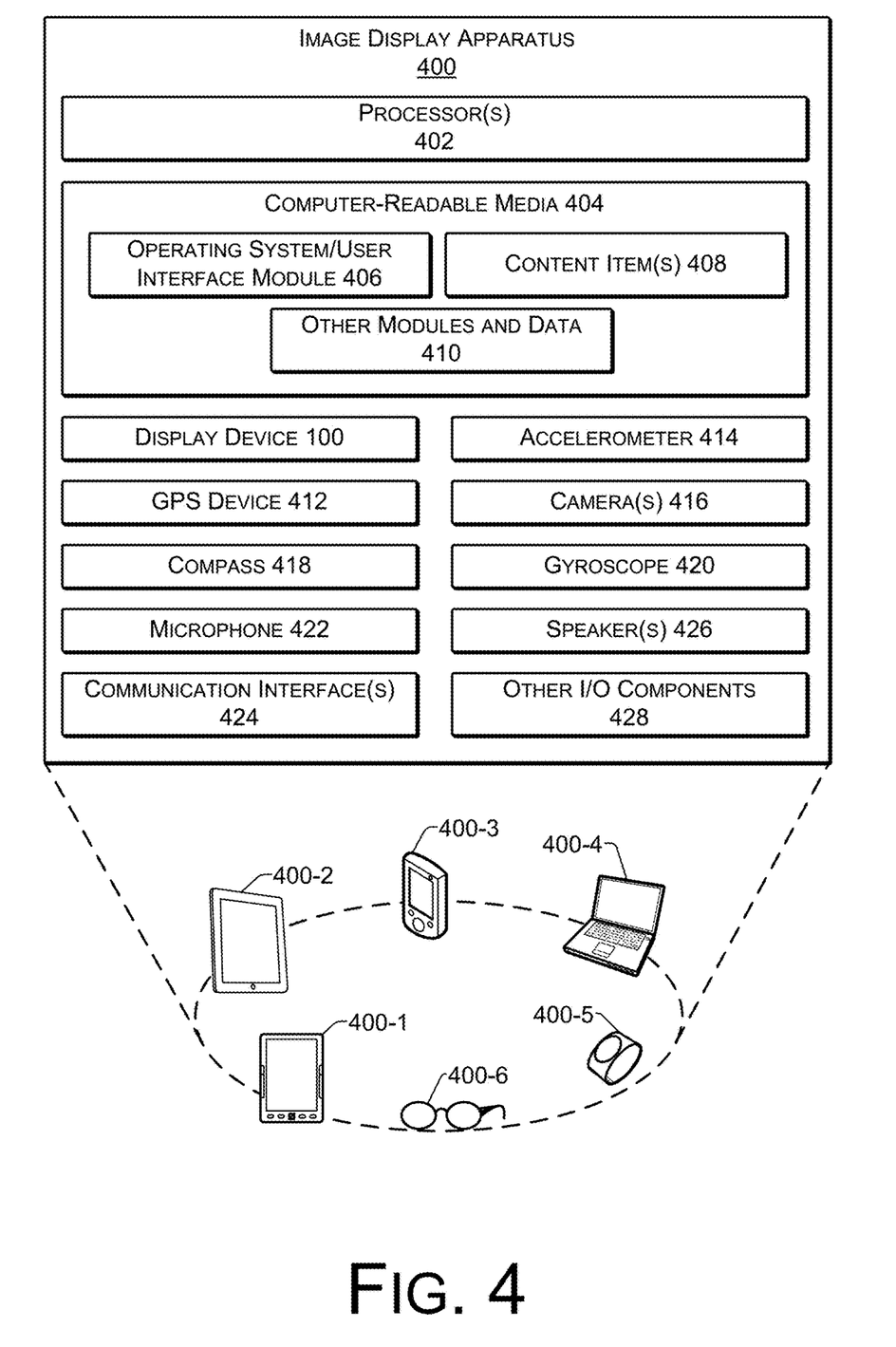
FIG. 4 illustrates select components of an example image display apparatus that may include an electrowetting display device, according to various embodiments.

FIG. 4 illustrates select example components of an example image display apparatus 400 that may be used with the electrowetting display device 100 according to some implementations. Other types of displays may also be used with the example image display apparatus 400. Such types of displays include, but are not limited to, LCDs, cholesteric displays, electrophoretic displays, electrofluidic pixel displays, photonic ink displays, and the like.

The image display apparatus 400 may be implemented as any of a number of different types of electronic devices. Some examples of the image display apparatus 400 may include digital media devices and eBook readers 400-1; tablet computing devices 400-2; smart phones, mobile devices and portable gaming systems 400-3; laptop and netbook computing devices 400-4; wearable computing devices 400-5; augmented reality devices, helmets, goggles or glasses 400-6; and any other device capable of connecting with the electrowetting display device 100 and including a processor and memory for controlling the display according to the techniques described herein.

In a very basic configuration, the image display apparatus 400 includes, or accesses, components such as at least one control logic circuit, central processing unit, or processor 402, and one or more computer-readable media 404. Each processor 402 may itself comprise one or more processors or processing cores. For example, the processor 402 can be implemented as one or more microprocessors, microcomputers, microcontrollers, digital signal processors, central processing units, state machines, logic circuitries, and/or any devices that manipulate signals based on operational instructions. In some cases, the processor 402 may be one or more hardware processors and/or logic circuits of any suitable type specifically programmed or configured to execute the algorithms and processes described herein. The processor 402 can be configured to fetch and execute computer-readable instructions stored in the computer-readable media 404 or other computer-readable media. The processor 402 can perform one or more of the functions attributed to the timing controller 102, the source or data driver 104, and/or the gate or scan driver 106 of the electrowetting display device 100. The processor 402 can also perform one or more functions attributed to a graphic controller (not illustrated) for the electrowetting display device.

Depending on the configuration of the image display apparatus 400, the computer-readable media 404 may be an example of tangible non-transitory computer storage media and may include volatile and nonvolatile memory and/or removable and non-removable media implemented in any type of technology for storage of information such as computer-readable instructions, data structures, program modules or other data. The computer-readable media 404 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the image display apparatus 400 may access external storage, such as RAID storage systems, storage arrays, network attached storage, storage area networks, cloud storage, or any other medium that can be used to store information and that can be accessed by the processor 402 directly or through another computing device or network. Accordingly, the computer-readable media 404 may be computer storage media able to store instructions, modules or components that may be executed by the processor 402.

The computer-readable media 404 may be used to store and maintain any number of functional components that are executable by the processor 402. In some implementations, these functional components comprise instructions or programs that are executable by the processor 402 and that, when executed, implement operational logic for performing the actions attributed above to the image display apparatus 400. Functional components of the image display apparatus 400 stored in the computer-readable media 404 may include the operating system and user interface module 406 for controlling and managing various functions of the image display apparatus 400, and for generating one or more user interfaces on the electrowetting display device 100 of the image display apparatus 400.

In addition, the computer-readable media 404 may also store data, data structures and the like, that are used by the functional components. For example, data stored by the computer-readable media 404 may include user information and, optionally, one or more content items 408. Depending on the type of the image display apparatus 400, the computer-readable media 404 may also optionally include other functional components and data, such as other modules and data 410, which may include programs, drivers and so forth, and the data used by the functional components. Further, the image display apparatus 400 may include many other logical, programmatic and physical components, of which those described are merely examples that are related to the discussion herein. Further, while the figures illustrate the functional components and data of the image display apparatus 400 as being present on the image display apparatus 400 and executed by the processor 402 on the image display apparatus 400, it is to be appreciated that these components and/or data may be distributed across different computing devices and locations in any manner.

FIG. 4 further illustrates examples of other components that may be included in the image display apparatus 400. Such examples include various types of sensors, which may include a GPS device 412, an accelerometer 414, one or more cameras 416, a compass 418, a gyroscope 420, a microphone 422, and so forth.

The image display apparatus 400 may further include one or more communication interfaces 424, which may support both wired and wireless connection to various networks, such as cellular networks, radio, Wi-Fi networks, close-range wireless connections, near-field connections, infrared signals, local area networks, wide area networks, the Internet, and so forth. The communication interfaces 424 may further allow a user to access storage on or through another device, such as a remote computing device, a network attached storage device, cloud storage, or the like.

The image display apparatus 400 may further be equipped with one or more speakers 426 and various other input/output (I/O) components 428. Such I/O components 428 may include a touchscreen and various user controls (e.g., buttons, a joystick, a keyboard, a keypad, etc.), a haptic or tactile output device, connection ports, physical condition sensors, and so forth. For example, the operating system 406 of the image display apparatus 400 may include suitable drivers configured to accept input from a keypad, keyboard, or other user controls and devices included as the I/O components 428. Additionally, the image display apparatus 400 may include various other components that are not illustrated, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. An electrowetting display device, comprising:
   a substrate;
   an electrode layer on the substrate, wherein the electrode layer extends from a first end of a pixel area toward an opposing second end of the pixel area;
   a dielectric layer on the substrate, wherein the dielectric layer extends toward the opposing second end of the pixel area, and the dielectric layer partly overlaps the electrode layer; and
   a hydrophobic layer on at least a portion of the electrode layer and a portion of the dielectric layer.

2. The electrowetting display device of claim 1, wherein the dielectric layer overlaps an end portion of the electrode layer.

3. The electrowetting display device of claim 1, wherein the electrode layer comprises indium tin oxide and wherein the hydrophobic layer comprises a fluoropolymer.

4. The electrowetting display device of claim 1, further comprising a barrier layer on the electrode layer, wherein the barrier layer at least partially separates the electrode layer from the hydrophobic layer.

5. The electrowetting display device of claim 1, wherein a thickness of the dielectric layer is between 0.5 micrometers and 1.5 micrometers.

6. The electrowetting display device of claim 1, wherein a length of the dielectric layer is less than twenty percent of a length between the first end of the pixel area and the opposing second end of the pixel area.

7. The electrowetting display device of claim 1, further comprising:
   a first pixel wall on the substrate at the first end of the pixel area; and
   a second pixel wall on the substrate at the opposing second end of the pixel area.

8. The electrowetting display device of claim 7, wherein at least a portion of the dielectric layer is beneath the second pixel wall.

9. An electrowetting display device comprising a pixel area on a substrate, the pixel area comprising:
   an electrode layer on the substrate, wherein the electrode layer extends from a first location associated with a first pixel wall to a second location associated with a second pixel wall, wherein the first pixel wall is on an opposite side of the pixel area from the second pixel wall, and wherein the second location is a first distance from the second pixel wall;
   a dielectric layer on the substrate, wherein the dielectric layer extends from an edge of the second location to at least the second pixel wall, a portion of the dielectric layer is on the electrode layer, and a portion of the electrode layer is not covered by the dielectric layer;
   a hydrophobic layer on at least a portion of the electrode layer and a portion of the dielectric layer;
   a first fluid on the hydrophobic layer, wherein a dielectric constant of the dielectric layer is different than a dielectric constant of the first fluid; and
   a second fluid on the first fluid, the second fluid immiscible with the first fluid.

10. The electrowetting display device of claim 9, wherein at least a portion of the dielectric layer is beneath the second pixel wall.

11. The electrowetting display device of claim 9, wherein the first distance is less than twenty percent of a distance between the first pixel wall and the second pixel wall.

12. The electrowetting display device of claim 9, wherein the first fluid is an electrowetting oil and wherein the second fluid is an electrolyte.

13. The electrowetting display device of claim 9, wherein the electrode layer comprises indium tin oxide, the hydrophobic layer comprises a fluoropolymer, and the first pixel wall and the second pixel wall each comprise a photoresist.

14. The electrowetting display device of claim 9, further comprising a barrier layer on the electrode layer, wherein the barrier layer is between at least a portion of the electrode layer and the hydrophobic layer.

15. The electrowetting display device of claim 9, further comprising a reflective layer on the substrate.

16. The electrowetting display device of claim 9, wherein a thickness of the dielectric layer is between 0.5 micrometers and 1.5 micrometers; a height of the first pixel wall above the hydrophobic layer is about 3 micrometers; and a height of the second pixel wall above the hydrophobic layer is about 3 micrometers.

17. A method of making an electrowetting device, the method comprising:
- providing a substrate;
- depositing an electrode layer on the substrate;
- depositing a dielectric layer on the substrate, such that a portion of the dielectric layer is on the electrode layer, and a portion of the electrode layer is not covered by the dielectric layer;
- depositing a hydrophobic layer on at least a portion of the electrode layer and a portion of the dielectric layer;
- disposing a first fluid on the hydrophobic layer, wherein a dielectric constant of the dielectric layer is greater than a dielectric constant of the first fluid; and
- disposing a second fluid on the first fluid, the second fluid immiscible with the first fluid.

18. The method of claim 17, further comprising:
- prior to depositing the dielectric layer, removing a portion of the electrode layer to create a notch,
- wherein depositing the dielectric layer comprises depositing the dielectric layer such that a first portion of the dielectric layer is disposed on an end portion of the electrode layer and a second portion of the dielectric layer is disposed on the notch.

* * * * *